R. E. CARTER.
YIELDABLE DRIVE SHAFT.
APPLICATION FILED DEC. 27, 1920.
1,416,264.
Patented May 16, 1922.
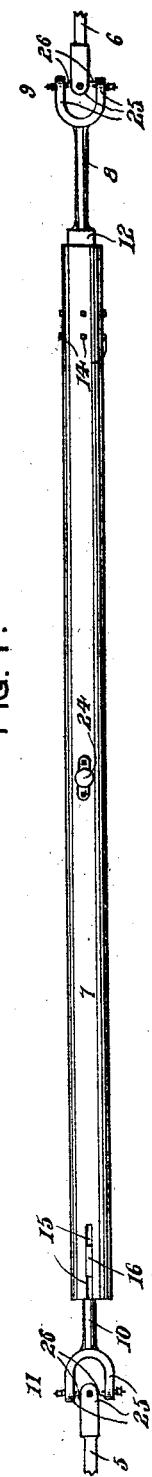
Fig. 1.
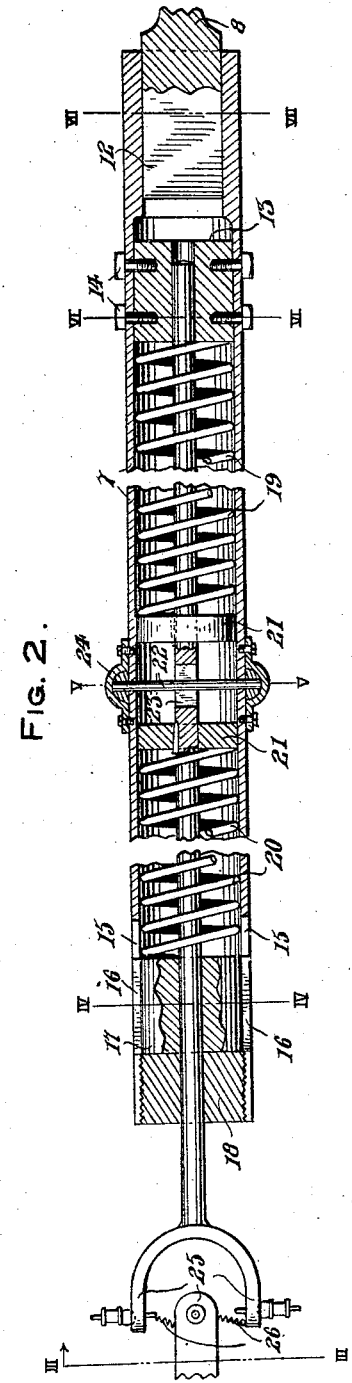
Fig. 2.
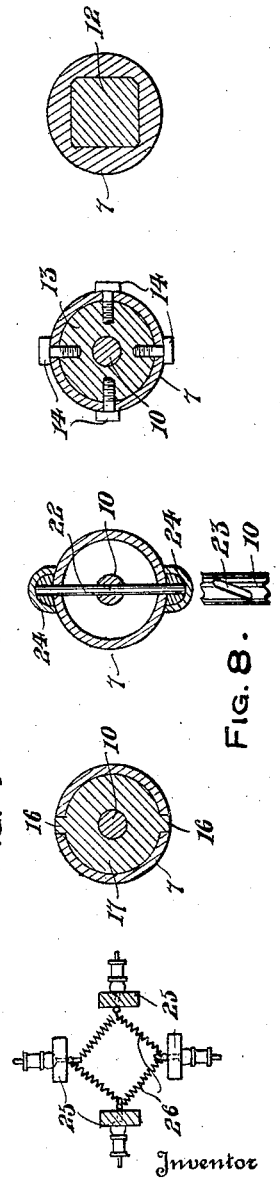
Fig. 7.
Fig. 6.
Fig. 5.
Fig. 4.
Fig. 8.
Fig. 3.
Inventor
Robert E. Carter
By J. S. Dowling
Attorney

UNITED STATES PATENT OFFICE.

ROBERT EARL CARTER, OF SYKESVILLE, MARYLAND.

YIELDABLE DRIVE SHAFT.

1,416,264.  Specification of Letters Patent.  Patented May 16, 1922.

Application filed December 27, 1920. Serial No. 433,171.

*To all whom it may concern:*

Be it known that ROBERT EARL CARTER, citizen of the United States, residing at Sykesville, in the State of Maryland, has invented certain new and useful Improvements in Yieldable Drive Shafts, of which the following is a specification.

This invention relates to certain new and useful improvements in yieldable drive shafts, and relates more particularly to a shaft construction of this kind adapted to relieve the gearing, and other parts of the propulsion mechanism of a motor vehicle, from the constant detrimental torsional strains to which they are subjected when the clutch of the vehicle is "thrown in", after the motor is started for propelling the vehicle.

Briefly described, the invention resides in a novel and improved shaft construction, adapted to couple a driving element and a driven element, and devised to permit slight turning of the driving element against gradually increasing resistance, before the turning movement of the driving element is communicated to the driven element. Obviously, when the invention is applied to motor vehicles, the starting of the vehicle will be had free of jerks and strains, enhancing the comfort and safety of the occupant of the vehicle and increasing the life of the vehicle, particularly the propulsion mechanism of the latter.

An object of the invention is to provide a yieldable shaft of the above kind which shall be simple in construction and capable of being cheaply and easily manufactured and placed in use, as well as being durable and efficient in operation, the necessary attributes for insuring successful commercialization.

The invention consists in the novel form, combination and arrangement of parts, hereinafter more fully described and claimed in connection with the accompanying drawing, wherein like reference characters indicate similar parts throughout the several views.

In the drawing,

Figure 1 is a fragmentary plan view of a part of a motor vehicle propulsion mechanism equipped with the present invention, Figure 2 is an enlarged view of the major portion of Figure 1, with parts in vertical longitudinal section, and parts in side elevation, Figure 3 is a transverse sectional view taken on line III—III of Figure 2 and showing a universal joint preferably employed with the yieldable shaft of the present invention, Figure 4 is a similar view taken on line IV—IV of Figure 2, Figure 5 is a similar view taken on line V—V of Figure 2, Figure 6 is a similar view taken on line VI—VI of Figure 2, Figure 7 is a similar view taken on line VII—VII of Figure 2, and Figure 8 is a fragmentary plan view of the driving element showing the oblique slot in the same.

Referring more in detail to the several views, the present invention is shown as particularly applicable as the longitudinal drive shaft of automobiles, the engine shaft being denoted by the numeral 5, and 6 denoting the propeller shaft leading to the differential gearing usually employed.

The yieldable shaft includes a hollow elogated member or tube 7 having a driven shaft section or element 8 at one end coupled by a universal joint 9 to the shaft 6, and having a driving shaft section or element 10 at the other end coupled by a similar joint 11 to the engine shaft 5.

The element 8 is preferably solid and is provided with an angular, preferably square inner end 12 fitting in a similarly shaped bore of the adjacent end of tube 7 as shown in Figure 2, whereby rotary movement of the tube will be instantly imparted to the element 8. The remainder or the bore of tube 7 is circular, and a guide plug 13 is secured in said tube adjacent the end 12 by means of stud screws 14 or the like, passing through the tube and screwing into said plug.

The opposite end of tube 7 is provided with longitudinal slots 15 into which the fins 16 of a second guide plug 17 are slid for a limited distance wherein the plug 17 is positioned in tube 7 a little inwardly of the adjacent end of the tube. A third guide plug 18 is threaded into tube 7 behind the plug 17 so as to secure the latter in place, and the plugs 13 and 17 form abutments for the outer ends of helical springs 19 and 20, respectively, which are placed in the tube 7.

The driving element 10 extends into the tube 7 for a distance sufficient to enter and loosely play in the central openings of the plugs 18, 17 and 13, and a pair of spaced disks or collars 21 are keyed upon the central portion of the element 10 so as to form abutments for the other ends of springs 19 and 20. The element 10 is rotatable and slidable in the plugs, and the disks 21 are similarly movable in the tube 7.

A pin 22 is rigidly carried by the tube 7, and this pin extends transversely through a longitudinal obliquely formed elongated slot 23 provided in element 10 between the disks 21. The pin 22 preferably projects through the opposed apertures in tube 7 and is kept from dropping out by caps 24 or the like suitably secured over said apertures and engaging the ends of the pin.

As shown, the joints 9 and 11 are preferably yieldable and each includes a pair of forks 25 arranged at right angles to each other and connected by tension springs 26.

In operation, rotation is imparted to driving element 10, and, by reason of the pin 22 engaging in the oblique slot 23, said element is drawn inwardly so as to gradually compress spring 19 until the pin 22 gently comes into contact with an end wall of slot 23, whereupon the tube 7 is caused to rotate and thereby rotate element 8. If element 10 is rotated in a reverse direction, it will move outwardly of tube 7 to compress spring 20 until pin 22 engages the other end wall of slot 23 for rotating tube 7 and element 8. Delayed rotation is thus imparted to element 8 from element 10 under a gradually increasing cushioning action, and jerks and torsional strains are thereby avoided.

It is believed that the construction and operation as well as the advantages of the present invention will be readily understood and appreciated from the foregoing description by those skilled in the art.

Minor changes may be made without departing from the spirit and scope of the invention as claimed.

What is claimed as new is:—

1. A yieldable drive shaft, including a driving element, a driven element, and means connecting said elements for permitting limited rotation of the driving element relative to the driven element under gradually increasing resistance, said connecting means including a tube in which said driving element is slidably and rotatably mounted, means to impart longitudinal movement to and to permit limited rotation of the driving element relative to said tube upon rotation of said driving element, and means to resist the longitudinal movement of said driving element, the means for imparting longitudinal movement to the driving element including a transverse pin rigid with the tube, said driving element having a longitudinal elongated obliquely arranged slot through which the transverse pin extends.

2. A yieldable drive shaft, including a driving element, a driven element, and means connecting said elements for permitting limited rotation of the driving element relative to the driven element under gradually increasing resistance, said connecting means including a tube in which said driving element is slidably and rotatably mounted, means to impart longitudinal movement to and to permit limited rotation of the driving element relative to said tube upon rotation of said driving element, and means to resist the longitudinal movement of said driving element, said last named means including a pair of compression springs mounted in said tube and resisting longitudinal movement of the driving element in either direction, guide plugs for the driving element secured in the tube and each forming an abutment for the outer end of one spring, and abutment disks for the inner ends of the springs keyed on the driving element and freely movable in the tube, the means for imparting longitudinal movement to the driving element including a transverse pin rigid with the tube, said driving element having a longitudinal elongated obliquely arranged slot through which the transverse pin extends.

3. A yieldable drive shaft, including a driving element, a driven element, and means connecting said elements for permitting limited rotation of the driving element relative to the driven element under gradually increasing resistance, said connecting means including a tube in which said driving element is slidably and rotatably mounted, means to impart longitudinal movement to and to permit limited rotation of the driving element relative to said tube upon rotation of said driving element, and means to resist the longitudinal movement of said driving element, said last named means including a pair of compression springs mounted in said tube and resisting longitudinal movement of the driving element in either direction, guide plugs for the driving element secured in the tube and each forming an abutment for the outer end of one spring, and abutment disks for the inner ends of the springs keyed on the driving element and freely movable in the tube, the means for imparting longitudinal movement to the driving element including a transverse pin rigid with the tube, said driving element having a longitudinal elongated obliquely arranged slot through which the transverse pin extends.

4. A yieldable drive shaft, including a driving element, a driven element, and means connecting said elements for permitting limited rotation of the driving element relative to the driven element under gradually increasing resistance, said connecting means including a tube in which said driving element is slidably and rotatably mounted, means to impart longitudinal movement to and to permit limited rotation of the driving element relative to said tube upon rotation of said driving element, and means to resist the longitudinal movement of said driving element, said last named means including a pair of compression springs mounted in said tube and resisting longitudinal movement of the driving element in either direction, guide plugs for the driving element secured in the tube and each forming an abutment for the outer end of one spring, and abutment disks for the inner ends of the springs keyed on the driving element and freely movable in the tube, slots being provided in one end of the tube, one of said guide plugs having fins slidable into said slots, and another of said plugs being threaded into the tube behind the fin carrying plug to secure the latter in place.

5. A yieldable drive shaft, including a driving element, a driven element, and means connecting said elements for permitting limited rotation of the driving element relative to the driven element under gradually increasing resistance, said connecting means including a tube in which said driving element is slidably and rotatably mounted, means to impart longitudinal movement to and to permit limited rotation of the driving element relative to said tube upon rotation of said driving element, and means to resist the longitudinal movement of said driving element, said last named means including a pair of compression springs mounted in said tube and resisting longitudinal movement of the driving element in either direction, guide plugs for the driving element secured in the tube and each forming an abutment for the outer end of one spring, and abutment disks for the inner ends of the springs keyed on the driving element and freely movable in the tube, slots being provided in one end of the tube, one of said guide plugs having fins slidable into said slots, and another of said plugs being threaded into the tube behind the fin carrying plug to secure the latter in place, said tube having an angular bore at its other end, and the driven element having an angular end fitting in the angular bore.

In testimony whereof I hereunto affix my signature.

ROBERT EARL CARTER.